United States Patent
Shibata et al.

(10) Patent No.: US 10,919,175 B2
(45) Date of Patent: Feb. 16, 2021

(54) CHAIN SAW (71) Applicant: MAKITA CORPORATION, Anjo (JP)

(72) Inventors: Yoshinori Shibata, Anjo (JP); Daisuke Suzuki, Anjo (JP); Takuma Niiyama, Anjo (JP)

(73) Assignee: MAKITA CORPORATION, Anjo (JP)

(*) Notice: Subject to any disclaimer, the term of this patent is extended or adjusted under 35 U.S.C. 154(b) by 0 days.

(21) Appl. No.: 16/245,648

(22) Filed: Jan. 11, 2019

(65) Prior Publication Data
US 2019/0217496 A1 Jul. 18, 2019

(30) Foreign Application Priority Data
Jan. 12, 2018 (JP) .............................. JP2018-003678

(51) Int. Cl.
*B27B 17/02* (2006.01)
*B23D 57/02* (2006.01)

(52) U.S. Cl.
CPC ............ *B27B 17/02* (2013.01); *B23D 57/023* (2013.01)

(58) Field of Classification Search
CPC ............................... B27B 17/02; B23D 57/023
See application file for complete search history.

(56) References Cited

U.S. PATENT DOCUMENTS

| | | | | |
|---|---|---|---|---|
| 3,870,125 A * | 3/1975 | Gorski | ................... | B27B 17/02 184/15.1 |
| 4,117,594 A * | 10/1978 | Arbuckle | ............ | B27B 17/0033 30/381 |
| 4,188,719 A * | 2/1980 | Hoff | ..................... | A01D 34/416 30/122 |
| 4,408,393 A * | 10/1983 | Jerabek | ................... | B27B 17/02 30/123.4 |
| 6,128,997 A * | 10/2000 | Nitschmann | ............ | B27B 33/14 30/383 |
| 8,136,256 B2 * | 3/2012 | Wolf | ...................... | B27B 17/02 30/381 |
| 9,138,912 B2 * | 9/2015 | Kapinsky | ............. | B23D 59/006 |
| 9,498,895 B2 * | 11/2016 | Harer | ................... | B23D 59/006 |
| 2004/0098869 A1* | 5/2004 | Ashfield | ............. | B27B 17/0008 30/383 |
| 2008/0034597 A1* | 2/2008 | Pfleiderer | ............... | B27B 17/02 30/382 |
| 2014/0290074 A1 | 10/2014 | Takayanagi et al. | | |
| 2015/0089820 A1* | 4/2015 | Sorell | ..................... | B27B 17/02 30/383 |
| 2015/0321377 A1* | 11/2015 | Onose | ..................... | B27B 17/12 30/383 |
| 2019/0217496 A1* | 7/2019 | Shibata | ................ | B23D 57/023 |

FOREIGN PATENT DOCUMENTS

JP 2014-198367 A 10/2014

* cited by examiner

*Primary Examiner* — Hwei-Siu C Payer
(74) *Attorney, Agent, or Firm* — Sughrue Mion, PLLC (57) ABSTRACT

A chain saw may include a saw chain, a guide bar to which the saw chain is attached, a sprocket configured to move the saw chain along a periphery of the guide bar, a prime mover configured to rotate the sprocket, a housing that houses the prime mover, a bolt protruding from the housing and penetrating a hole provided in the guide bar, and a nut screwed to the bolt to fix the guide bar to the housing. The nut may be exposed to outside. A heat insulating structure may be provided on a heat transfer path between the nut and the guide bar.

8 Claims, 12 Drawing Sheets

CHAIN SAW

CROSS-REFERENCE

This application claims priority to Japanese Patent Application No. 2018-003678, filed on Jan. 12, 2018, the entire contents of which are incorporated herein by reference.

TECHNICAL FIELD

The disclosure herein relates to a chain saw.

BACKGROUND

Japanese Patent Application Publication No. 2014-198367 describes a chain saw. This chain saw includes a saw chain, a guide bar to which the saw chain is attached, a sprocket that moves the saw chain along a periphery of the guide bar, a prime mover that rotates the sprocket, a housing that houses the prime mover, a bolt protruding from the housing and penetrating a hole provided in the guide bar, and a nut screwed to the bolt to fix the guide bar to the housing. The nut is exposed to outside.

SUMMARY

When a cutting target is cut by using a chain saw, a guide bar becomes hot due to frictional heat generated by a saw chain and the guide bar. In a configuration in which a nut is exposed to outside as in the aforementioned one, the nut might become hot due to heat transfer from the guide bar, and a user might inadvertently touch this high-temperature nut. The disclosure herein provides a technique capable of preventing a nut exposed to outside from becoming hot due to heat transfer from a guide bar.

A chain saw disclosed herein may comprise a saw chain, a guide bar to which the saw chain is attached, a sprocket configured to move the saw chain along a periphery of the guide bar, a prime mover configured to rotate the sprocket, a housing that houses the prime mover, a bolt protruding from the housing and penetrating a hole provided in the guide bar, and a nut screwed to the bolt to fix the guide bar to the housing. The nut may be exposed to outside. A heat insulating structure may be provided on a heat transfer path between the nut and the guide bar.

According to the above configuration, the heat insulating structure is provided on the heat transfer path from the guide bar to the nut, so the nut can be prevented from becoming hot due to heat transfer from the guide bar, which became hot, to the nut.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved chain saws, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

In one or more embodiments, a chain saw may comprise a saw chain, a guide bar to which the saw chain is attached, a sprocket configured to move the saw chain along a periphery of the guide bar, a prime mover configured to rotate the sprocket, a housing that houses the prime mover, a bolt protruding from the housing and penetrating a hole provided in the guide bar, and a nut screwed to the bolt to fix the guide bar to the housing. The nut may be exposed to outside. A heat insulating structure may be provided on a heat transfer path between the nut and the guide bar.

According to the above configuration, the heat insulating structure provided on the heat transfer path from the guide bar to the nut can suppress the nut from becoming hot due to heat transfer from the high-temperature guide bar to the nut.

In one or more embodiments, the chain saw may further comprise a sprocket cover constituted of resin and covering the sprocket. The sprocket cover may be interposed between the nut and the guide bar.

According to the above configuration, the heat insulating structure, which is constituted of the resin sprocket cover and provided on the heat transfer path from the guide bar to the nut, can suppress the nut from becoming hot due to the heat transfer from the high-temperature guide bar to the nut.

In one or more embodiments, the sprocket cover may include a sleeve constituted of metal and interposed between the nut and the guide bar, and a heat insulating portion constituted of resin and interposed between the sleeve and the guide bar.

With the configuration in which the resin sprocket cover is interposed between the nut and the guide bar, if a thickness of the sprocket cover interposed between the nut and the guide bar is thick, the sprocket cover might be buckled and damaged when the nut is firmly tightened. In the above configuration, however, the sleeve receives a load upon tightening the nut, so the sprocket cover can be suppressed from being buckled and damaged. In this case, the metal sleeve constitutes a part of the heat transfer path from the guide bar to the nut, however, since the heat insulating portion is provided between the sleeve and the guide bar in the above configuration, the nut can be suppressed from becoming hot due to the heat transfer from the high-temperature guide bar to the nut.

In one or more embodiments, the sprocket cover may include a sleeve constituted of metal and interposed between the nut and the guide bar, and a heat insulating portion constituted of resin and interposed between the nut and the sleeve.

With the configuration in which the resin sprocket cover is interposed between the nut and the guide bar, if the thickness of the sprocket cover interposed between the nut and the guide bar is thick, the sprocket cover might be buckled and damaged when the nut is firmly tightened. In the above configuration, however, the sleeve receives the load upon tightening the nut, so the sprocket cover can be suppressed from being buckled and damaged. In this case, the metal sleeve constitutes a part of the heat transfer path from the guide bar to the nut, however, since the heat insulating portion is provided between the nut and the sleeve in the above configuration, the nut can be suppressed from becoming hot due to the heat transfer from the high-temperature guide bar to the nut.

In one or more embodiments, the chain saw may further comprise a washer constituted of resin. The sprocket cover may include a sleeve constituted of metal and interposed between the nut and the guide bar. The washer may be interposed between the nut and the sleeve.

With the configuration in which the resin sprocket cover is interposed between the nut and the guide bar, if the thickness of the sprocket cover interposed between the nut and the guide bar is thick, the sprocket cover might be buckled and damaged when the nut is firmly tightened. In the above configuration, however, the sleeve receives the load upon tightening the nut, so the sprocket cover can be suppressed from being buckled and damaged. In this case, the metal sleeve constitutes a part of the heat transfer path from the guide bar to the nut, however, since the resin washer between the nut and the sleeve serves as the heat insulating structure in the above configuration, the nut can be suppressed from becoming hot due to the heat transfer from the high-temperature guide bar to the nut.

In one or more embodiments, a heat insulating portion formed by air may be provided between an inner peripheral surface of the hole of the guide bar and the bolt.

As the heat transfer path from the guide bar to the nut, aside from a path that transfers heat from the guide bar to the nut without intervention of the bolt, there also is a path that transfers heat from the guide bar to the bolt and then from the bolt to the nut. In the above configuration, the aerial heat insulating portion is provided on the heat transfer path from the guide bar to the bolt, and thus the nut can be suppressed from becoming hot due to the heat transfer from the high-temperature guide bar to the nut.

In one or more embodiments, a heat insulating portion constituted of resin may be provided between an inner peripheral surface of the hole of the guide bar and the bolt.

As the heat transfer path from the guide bar to the nut, aside from the path that transfers heat from the guide bar to the nut without intervention of the bolt, there also is the path that transfers heat from the guide bar to the bolt and then from the bolt to the nut. In the above configuration, the resin heat insulating portion is provided on the heat transfer path from the guide bar to the bolt, and thus the nut can be suppressed from becoming hot due to the heat transfer from the high-temperature guide bar to the nut.

In one or more embodiments, when the chain saw is in use, the saw chain may be configured to be capable of moving along the periphery of the guide bar at a speed of 18 m/s or more, specifically at 20 m/s or more, and more specifically at 22 m/s or more.

In a case where the saw chain moves at high speed along the periphery of the guide bar, frictional heat between the saw chain and the guide bar becomes high and the guide bar thereby becomes hotter. According to the above configuration, the heat insulating structure is provided on the heat transfer path from the guide bar to the nut, and thus the nut can be suppressed from becoming hot due to the heat transfer from the guide bar having a higher temperature to the nut.

In one or more embodiments, a minimum radius of curvature of the periphery of the guide bar may be 20 mm or less, specifically 15 mm or less, and more specifically 10 mm or less.

In a case where the guide bar includes a portion with a small radius of curvature, the frictional heat between the saw chain and the guide bar becomes high at the portion, as a result of which the guide bar becomes hotter. According to the above configuration, the heat insulating structure is provided on the heat transfer path from the guide bar to the nut, the nut can be suppressed from becoming hot due to the heat transfer from the guide bar having a higher temperature to the nut.

In one or more embodiments, the prime mover may be a motor driven by electric power.

In a case where the prime mover is an electric motor, the housing does not have a portion having very high temperature as compared to a case where the prime mover is an engine, and thus a user is at a greater risk of inadvertently touching the nut exposed to outside without paying much attention. According to the above configuration, the heat insulating structure is provided on the heat transfer path from the guide bar to the nut, and thus the nut can be suppressed from becoming hot due to the heat transfer from the high-temperature guide bar to the nut.

In one or more embodiments, the chain saw may further comprise a battery configured to be detachably attached to the housing. The motor may be configured to be driven by electric power from the battery.

The chain saw configured to drive the motor by the electric power supply from the battery does not require a power cord, which provides improved workability with the chain saw, however, places the user at a greater risk of inadvertently touching the nut exposed to outside. According to the above configuration, the heat insulating structure is provided on the heat transfer path from the guide bar to the nut, the nut can be suppressed from becoming hot due to the heat transfer from the high-temperature guide bar to the nut.

Embodiment

Figure 1:
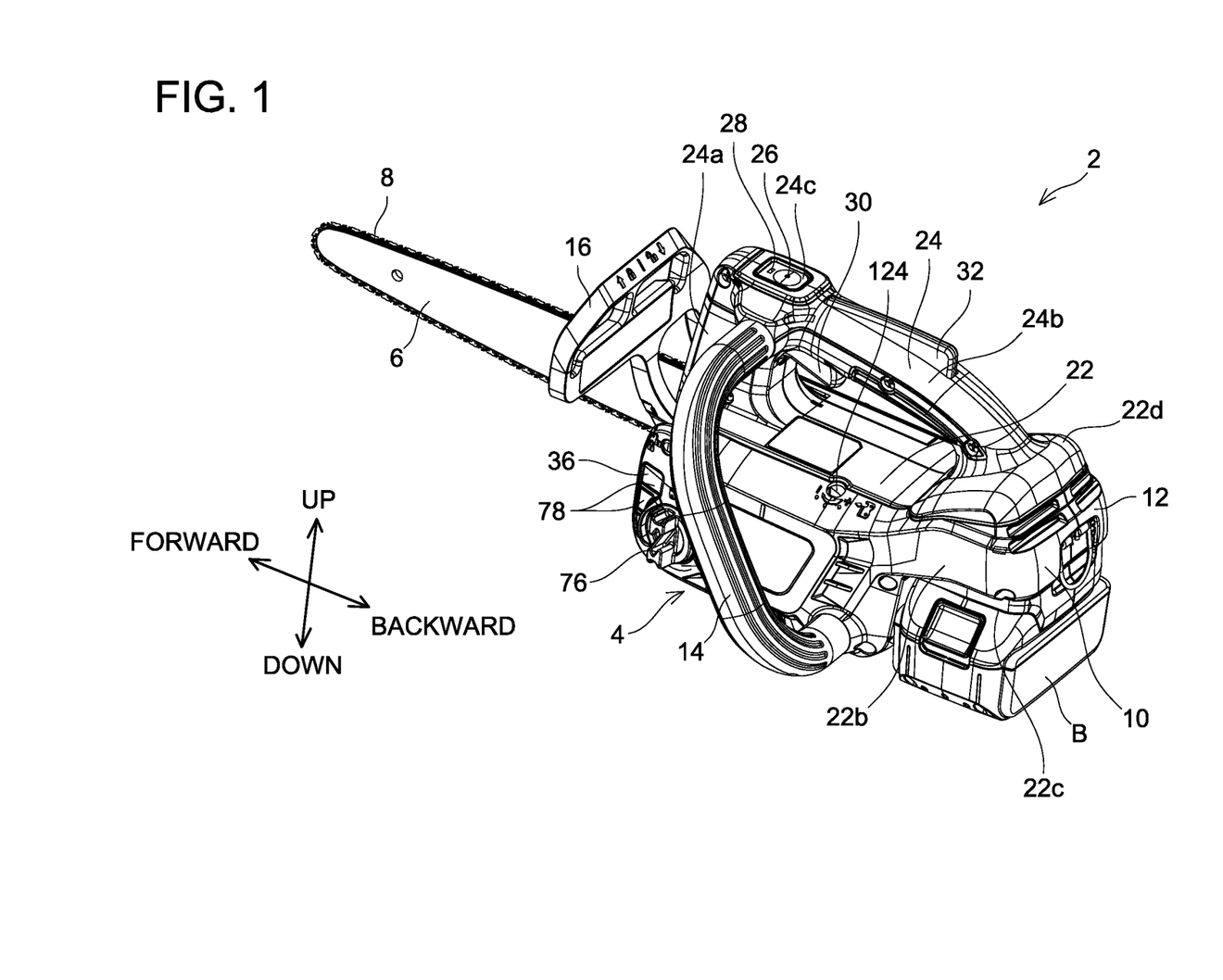
FIG. 1 is a perspective view seeing a chain saw 2 of an embodiment from an upper rear left side.
Figure 2:
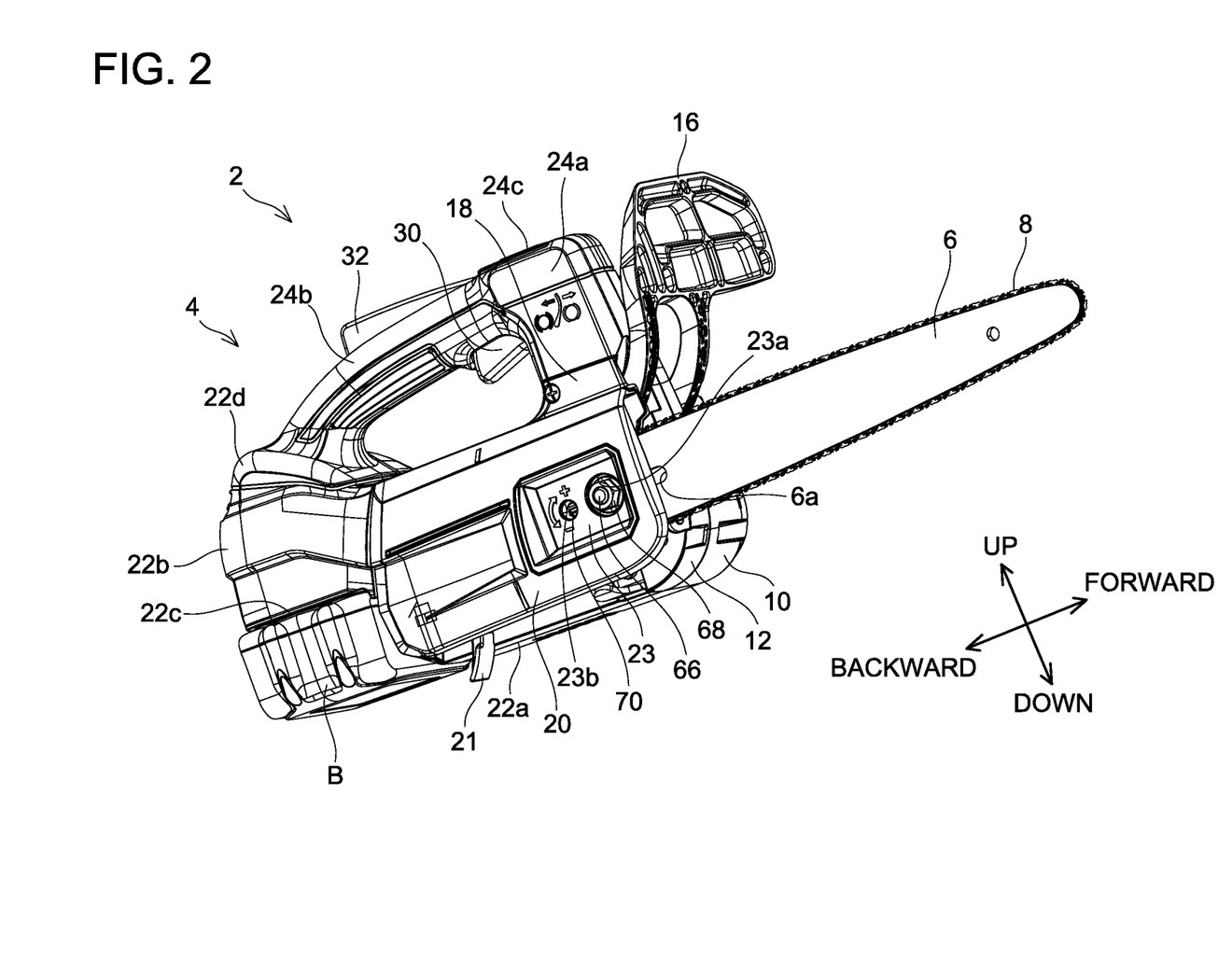
FIG. 2 is a perspective view seeing the chain saw 2 of the embodiment from a lower front right side.
Figure 3:
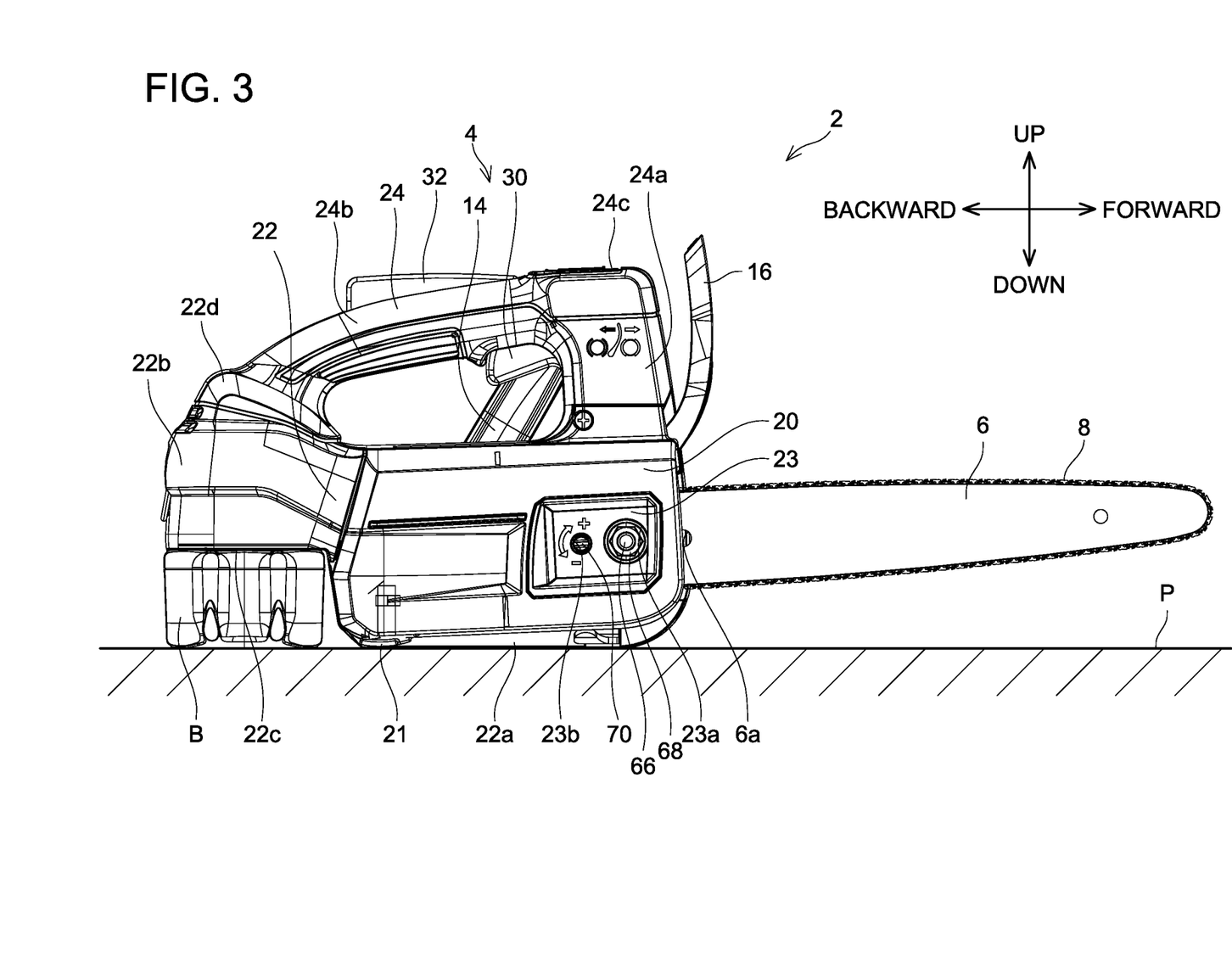
FIG. 3 is a right-side view of the chain saw 2 of the embodiment in a state where it is mounted on a mounting surface P.

As shown in FIGS. 1 and 2, a chain saw 2 of the present embodiment includes a main body 4, a guide bar 6, and a saw chain 8. The guide bar 6 is an elongate and narrow plate-like member attached to the main body 4 to protrude forward from the main body 4. The saw chain 8 includes a plurality of cutter teeth coupled to each other, and is attached along a periphery of the guide bar 6. The main body 4 has a battery B attached thereto. The chain saw 2 is configured to cut a cutting target, such as a wood piece, by driving the saw chain 8 to rotate along the periphery of the guide bar 6 by using electric power supplied from the battery B. Various types of guide bars may be attached as the guide bar 6 according to a content of cutting work. In an example shown in FIGS. 1 and 2, a radius of curvature of a distal end of the guide bar 6 is 10 mm, for example. The chain saw 2 of the present embodiment is configured to drive the saw chain 8 to rotate along the periphery of the guide bar 6 at a speed of 22.5 m/s, for example. In the description below, when the chain saw 2 is placed on a mounting surface P such as a ground as shown in FIG. 3, a direction perpendicularly intersecting the mounting surface P is termed an up-and-down direction of the chain saw 2, a direction that projects a longitudinal direction of the guide bar 6 on the mounting surface P is termed a front-and-rear direction of the chain saw 2, and a direction that perpendicularly intersects both the up-and-down direction and the front-and-rear direction of the chain saw 2 is termed a left-and-right direction of the chain saw 2. In the drawings other than FIGS. 1 to 3, depiction of the saw chain 8 is omitted for clearer view therein.

As shown in FIGS. 1 and 2, the main body 4 includes a left housing 10, a right housing 12, a side handle 14, a hand guard 16, a brake cover 18, and a sprocket cover 20. A main body housing 22 and a top handle 24 are configured by the left housing 10 and the right housing 12. The left housing 10 constitutes outer shapes of left-halves of the main body housing 22 and the top handle 24, and the right housing 12 constitutes outer shapes of right-halves of the main body housing 22 and the top handle 24.

The main body housing 22 includes a front main body housing 22a having a substantially rectangular solid shape with its longitudinal direction in the front-and-rear direction of the main body 4, and a rear main body housing 22b extending rearward from an upper rear part of the front main body housing 22a. A battery receiver 22c to which the battery B can be detachably attached by sliding the battery B in the left-and-right direction is provided on a lower surface of the rear main body housing 22b. As shown in FIG. 3, in a case where the chain saw 2 is placed on the mounting surface P in a state where the battery B is attached to the chain saw 2, a lower surface of the front main body housing 22a contacts the mounting surface P, and a lower surface of the battery B also contacts the mounting surface P.

As shown in FIG. 1, the top handle 24 includes a support 24a having a substantially square column shape protruding upward from an upper front surface of the front main body housing 22a, and a grip 24b which has a substantially circular cross section, extends rearward from an upper rear part of the support 24a, bends downward, and connects to an upper surface of the rear main body housing 22b. A recess 24c is provided in an upper surface of the support 24a. Inside the recess 24c, a power switch 26 for a user to manipulate to switch power of the chain saw 2 between on and off, and a power indicator 28 configured to indicate an on/off state of the chain saw 2 are provided. A trigger switch 30 for the user to manipulate to drive and rotate the saw chain 8 is disposed on a lower front surface of the grip 24b. A trigger lock lever 32 configured to switch between a state that allows the user to manipulate the trigger switch 30 and a state that prohibits the user from manipulating the trigger switch 30 is disposed at an upper portion of the grip 24b.

The side handle 14 has a substantially U-shaped outer shape which connects an upper rear left surface of the support 24a of the top handle 24 and a lower rear left surface of the front main body housing 22a. A cross-section of the side handle 14 is substantially circular. Upon using the chain saw 2, the user holds the top handle 24 with his/her right hand and holds the side handle 14 with his/her left hand to retain the chain saw 2. From this state, when the user pushes down the trigger lock lever 32 of the top handle 24 with the palm of the right hand, the trigger switch 30 is allowed to be manipulated by the user. From this state, when the user pushes up the trigger switch 30 with the index finger of the right hand, the saw chain 8 is driven to rotate. A hand rest 22d where the user can place the hand is provided on the upper surface of the rear main body housing 22b, that is, at a portion where the grip 24b of the top handle 24 connects to the main body housing 22.

Figure 4:
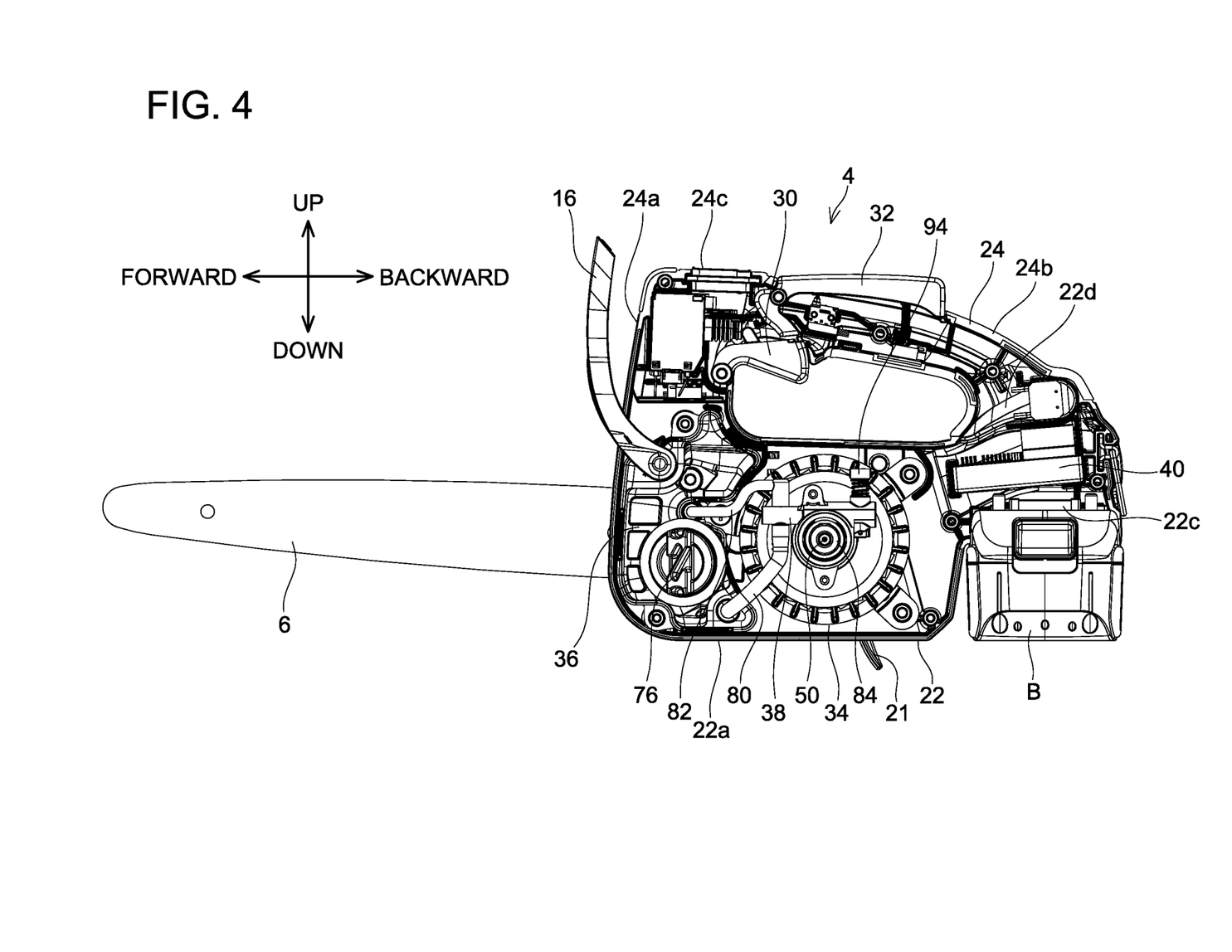
FIG. 4 is a left-side view of the chain saw 2 of the embodiment in a state where a side handle 14 and a left housing 10 are detached.

As shown in FIG. 4, a motor 34, an oil tank 36, and an oil pump 38 are disposed inside the front main body housing 22a. Further, a control unit 40 is disposed inside the rear main body housing 22b. The oil tank 36 is disposed frontward than the motor 34 and the oil pump 38.

Figure 5:
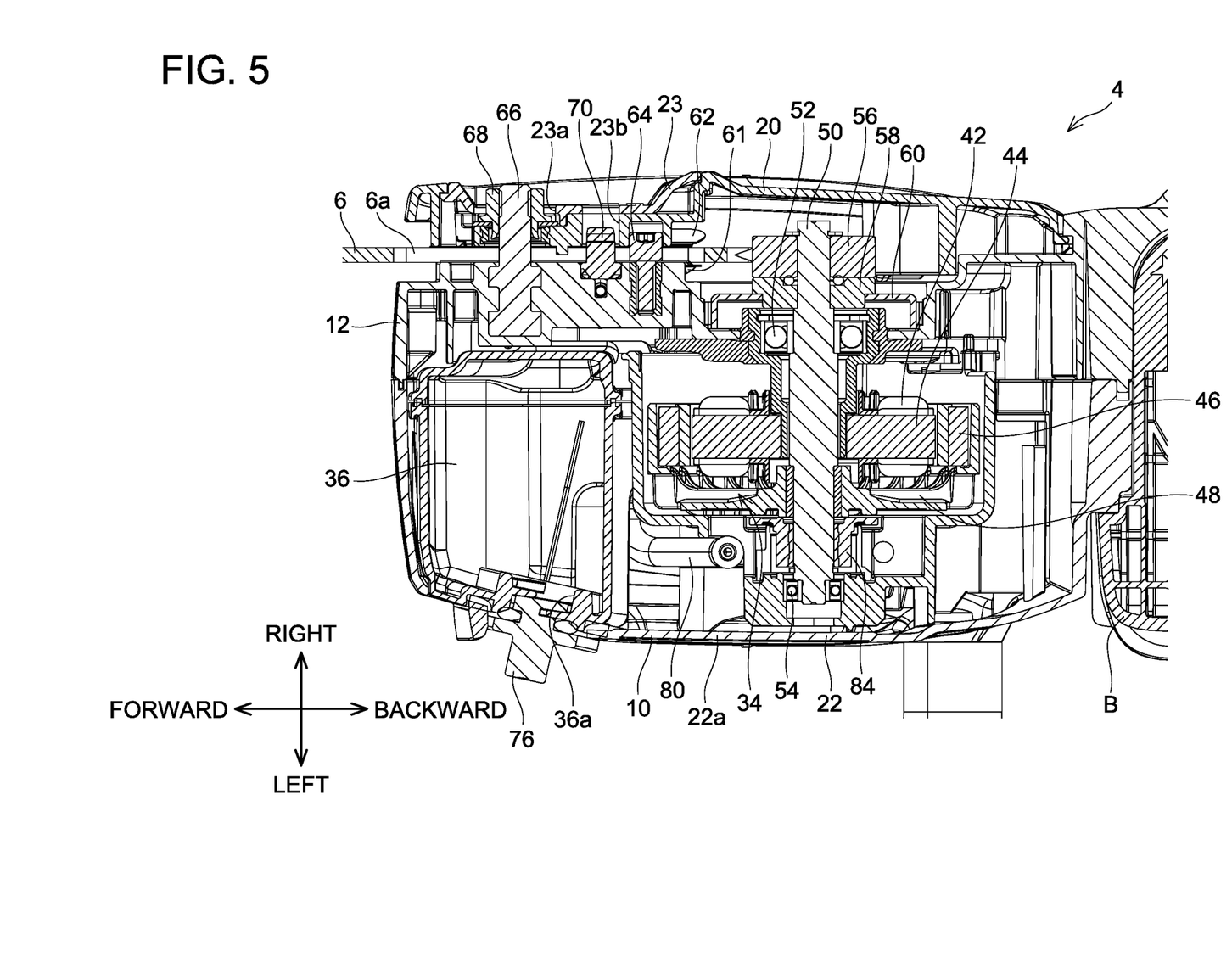
FIG. 5 is a lateral cross-sectional view of a main body 4 of the chain saw 2 of the embodiment.

As shown in FIG. 5, the motor 34 is an outer rotor-type DC brushless motor. The motor 34 includes a stator 44 onto which a coil 42 is wound, a rotor 46 arranged outside the stator 44, a cooling fan 48 engaged to the rotor 46, and an output shaft 50 disposed to penetrate through centers of the stator 44 and the rotor 46 and engaged to the cooling fan 48. The stator 44 is fixed to the main body housing 22. The coil 42 of the stator 44 is connected to the control unit 40 (see FIG. 4). Although not shown, the control unit 40 includes an inverter circuit provided with switching elements and a control circuit configured to control operations of those switching elements, and it is configured to control operation of the motor 34 by controlling a voltage to be applied to the coil 42. The output shaft 50 is disposed along the left-and-right direction of the chain saw 2 and is rotatably supported by the main body housing 22 via bearings 52, 54. The bearing 52 is disposed on the right side relative to the stator 44, and the bearing 54 is disposed on the left side relative to the stator 44 and the cooling fan 48. A sprocket 56 and a brake base 58 are fixed at a vicinity of a right end of the output shaft 50. The sprocket 56 and the brake base 58 are disposed on the right side relative to the bearing 52. A brake drum 60 is fitted to the brake base 58.

Figure 6:
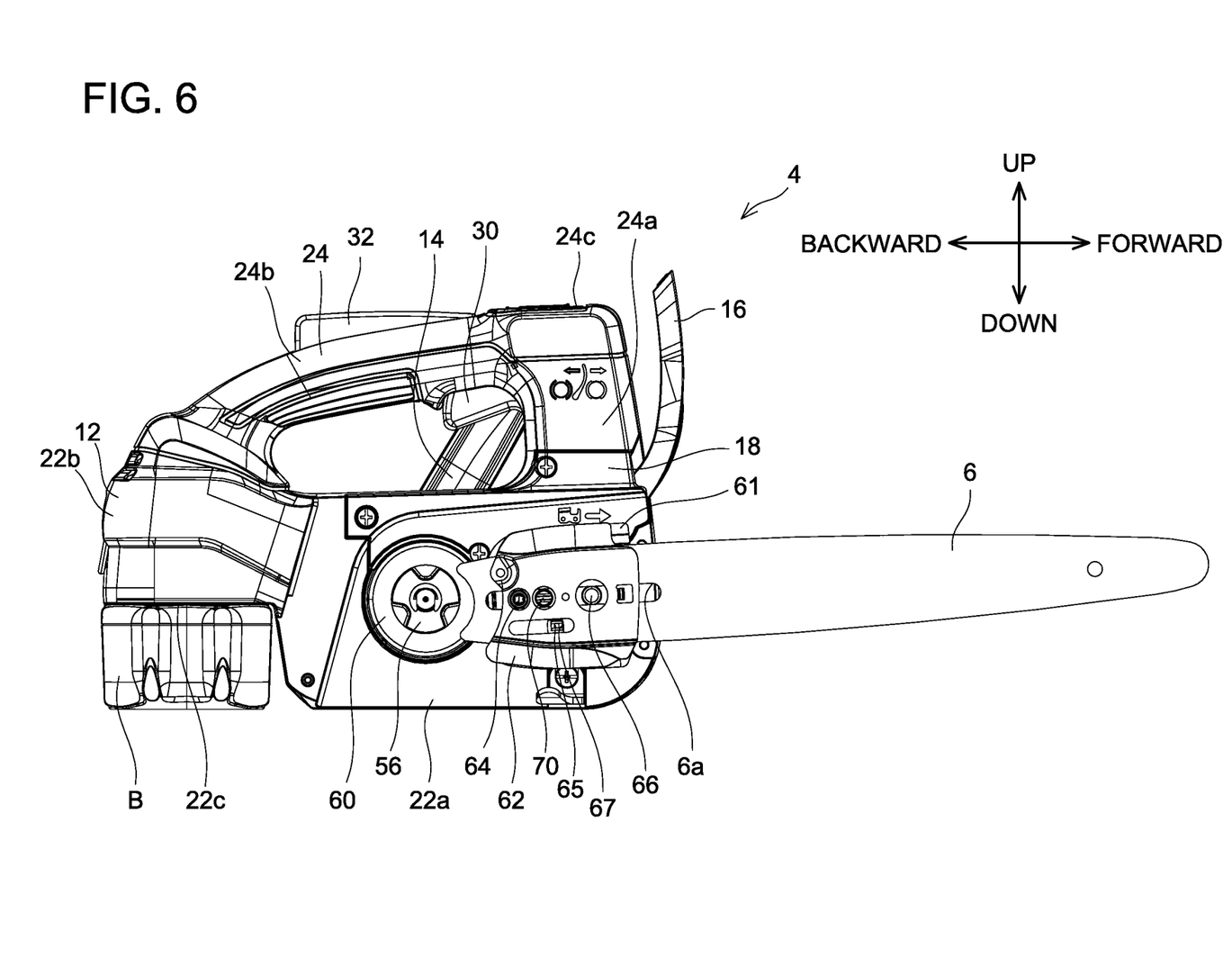
FIG. 6 is a right-side view of the chain saw 2 of the embodiment in a state where a sprocket cover 20 is detached.

As shown in FIG. 6, the sprocket 56 is exposed to outside the right housing 12. The saw chain 8 is strapped on the sprocket 56 from the guide bar 6 (see FIGS. 1 to 3). When the motor 34 is driven, the sprocket 56 rotates together with the output shaft 50, by which the saw chain 8 rotates around the sprocket 56 and the guide bar 6.

The guide bar 6 is fixed to the right housing 12 in a state of being interposed between an inner guide plate 61 and an outer guide plate 62. The inner guide plate 61 has a shape having its portions near its upper end and lower end curved inwardly (toward the left side of the chain saw 2). The outer guide plate 62 has a shape having its portions near its upper end and lower end curved outwardly (toward the right side of the chain saw 2). A long hole 6a extending along a longitudinal direction of the guide bar 6 is provided in the guide bar 6. The guide bar 6 is supported on the main body housing 22 via a support pin 64 and a bolt 66 which penetrate through the long hole 6a. As shown in FIGS. 2 and 3, a nut 68 is attached to the bolt 66 by being tightened from outside the sprocket cover 20 and the outer guide plate 62. The user can change a distance between the guide bar 6 and the sprocket 56 by sliding the guide bar 6 along the long hole 6a in a state where the nut 68 is loosened, to adjust tension on the saw chain 8.

Figure 7:
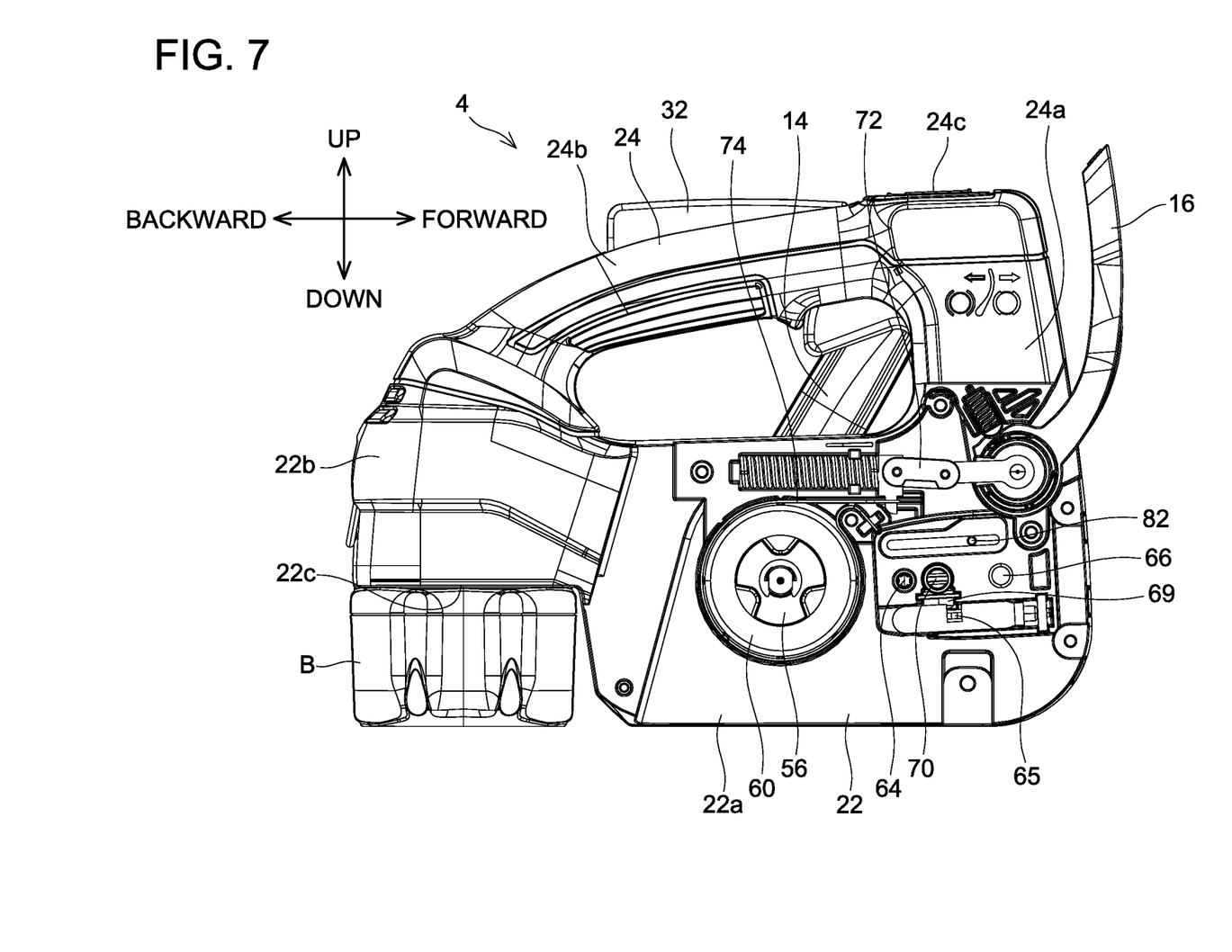
FIG. 7 is a right-side view of the chain saw 2 of the embodiment in a state where the sprocket cover 20, a guide bar 6, and a brake cover 18 are detached.

As shown in FIG. 6, the guide bar 6 is provided with an engagement hole 67 which engages with an engaging pawl 65. As shown in FIG. 7, the engaging pawl 65 is coupled to an adjustor screw 70 via a rotation-linear motion converting mechanism 69. The rotation-linear motion converting mechanism 69 is configured to convert rotary motion of the adjustor screw 70 to linear motion of the engaging pawl 65 in a direction along the long hole 6a. As shown in FIGS. 5 and 6, the adjustor screw 70 penetrates the long hole 6a without contacting an inner peripheral surface of the long hole 6a. When the user rotates the adjustor screw 70, the engaging pawl 65 moves in the direction along the long hole 6a of the guide bar 6, by which the guide bar 6 slides in the direction along the long hole 6a.

As shown in FIGS. 2 and 3, the sprocket 56, the inner guide plate 61, the outer guide plate 62, and the support pin 64 are covered by the sprocket cover 20. An outer cover 23 provided with a recess is attached to the sprocket cover 20. The outer cover 23 includes a tightening opening 23a for accessing the nut 68 fastened on the bolt 66 from outside, and an adjusting opening 23b for accessing the adjustor screw 70 from outside. The user can tighten or loosen the nut 68 in a state where the sprocket cover 20 is attached. Further, the user can adjust the tension of the saw chain 8 by rotating the adjustor screw 70 through the adjusting opening 23b in the state where the sprocket cover 20 is attached.

Figure 8:
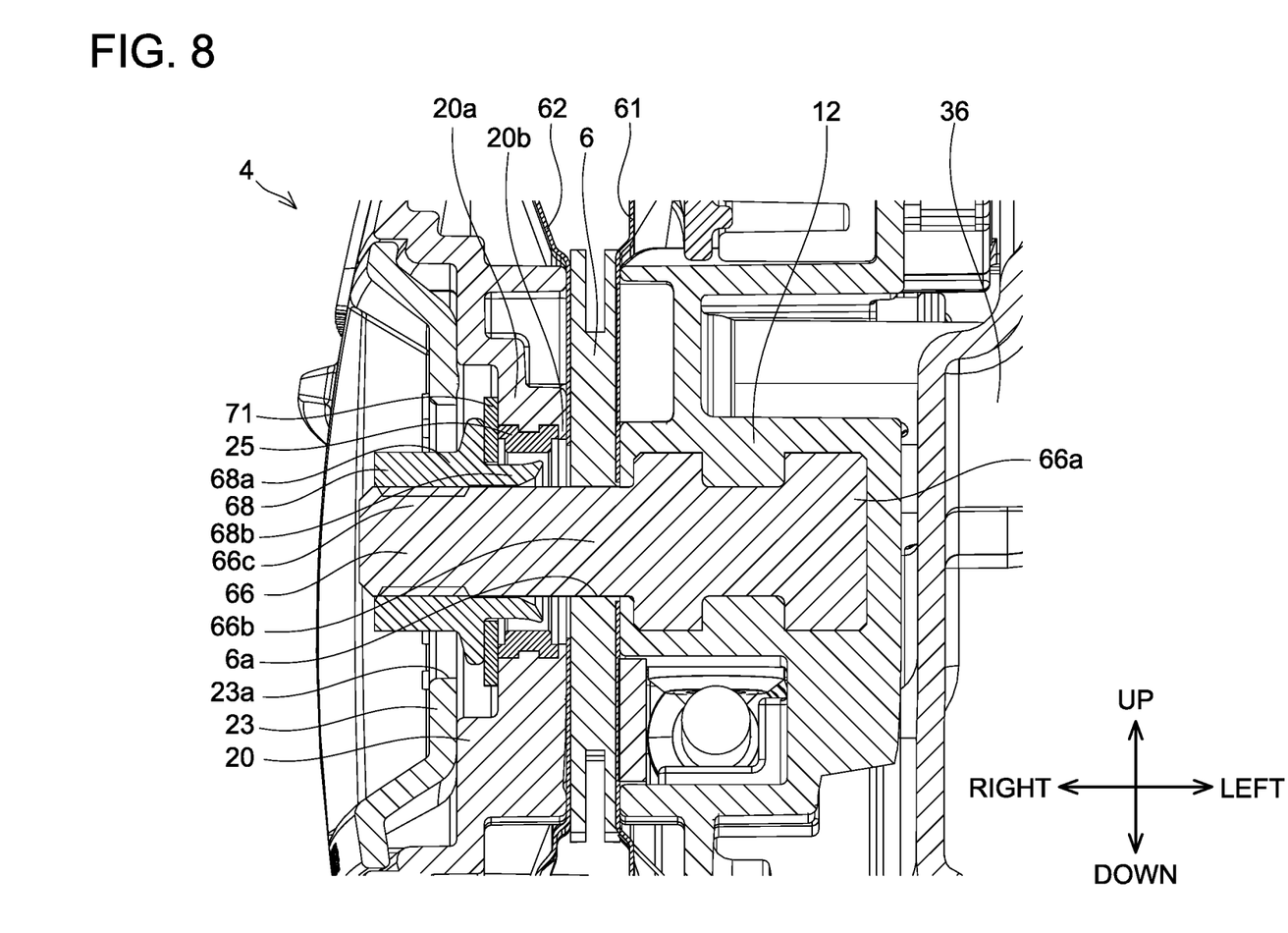
FIG. 8 is a vertical cross-sectional view of the chain saw 2 of the embodiment in a vicinity of a bolt 66 and a nut 68.

As shown in FIG. 8, the bolt 66 includes a base portion 66a fitted to the right housing 12, a shaft portion 66b having a cylinder shape contacting the inner peripheral surface of the long hole 6a of the guide bar 6, and a threaded portion 66c having an external thread on its outer surface. The nut 68 includes a head 68a having an internal thread on its inner surface, and a skirt 68b having a smaller outer diameter than the head 68a and extending from the head 68a in an inversed taper shape. The skirt 68b of the nut 68 has a washer 71 attached thereto. The sprocket cover 20 includes a washer receiver 20a. The washer receiver 20a has a metal sleeve 25 attached thereto. The internal thread of the head 68a of the nut 68 is screwed onto the external thread of the threaded portion 66c of the bolt 66. When the nut 68 is fastened, the inner guide plate 61, the guide bar 6, the outer guide plate 62, the washer receiver 20a, the sleeve 25, and the washer 71 are interposed and fixed between the head 68a of the nut 68 and the right housing 12. In a state where the nut 68 is fastened, a heat insulating portion 20b constituted of resin, which is a part of the sprocket cover 20, is interposed between the sleeve 25 and the outer guide plate 62, and thus the sleeve 25 and the outer guide plate 62 do not make direct contact. In the chain saw 2 of the present embodiment, the sleeve 25 receives a load applied to the washer receiver 20a of the sprocket cover 20 when the nut 68 is tightened, so the washer receiver 20a of the sprocket cover 20 can be suppressed from becoming buckled even in a case where the nut 68 is firmly tightened.

In the chain saw 2 of the present embodiment, the outer diameter of the skirt 68b is larger than an inner diameter of the washer 71. Further, an outer diameter of the washer 71 is larger than an inner diameter of the tightening opening 23a of the outer cover 23. Due to this, even in a case where the nut 68 is detached from the bolt 66, the nut 68 and the washer 71 are retained by the sprocket cover 20 and the outer cover 23. The nut 68 and the washer 71 can be suppressed from falling off.

As shown in FIG. 2, a lower guard 21 is provided at a lower rear part of the sprocket cover 20. The lower guard 21 is a plate-shaped member extending rearward and downward from a pivot shaft (not shown) along the left-and-right direction, and is configured to rotate about the pivot shaft. The lower guard 21 has a wider shape than the guide bar 6 in the left-and-right direction, a left end of the lower guard 21 is located on the left side relative to a left end of the guide bar 6, and a right end of the lower guard 21 is located on the right side relative to a right end of the guide bar 6. The lower guard 21 is biased by a torsion spring, which is not shown, in an opening direction, and it protrudes rearward and downward from the lower rear part of the sprocket cover 20 in a state where the user lifts the chain saw 2, as shown in FIG. 2. Due to this, cutting chips can be suppressed from flying to the user when a cutting target is cut by using the chain saw 2. As shown in FIG. 3, when the chain saw 2 is placed on the mounting surface P, the lower guard 21 pivots in a closing direction by contacting with the mounting surface P, and the lower guard 21 is housed in a space inside the sprocket cover 20.

As shown in FIG. 7, the hand guard 16 is coupled to a brake shoe 74 via a link mechanism 72. The hand guard 16 is configured to rotate about a pivot shaft along the left-and-right direction of the chain saw 2. The brake shoe 74 is disposed to surround a periphery of the brake drum 60. The link mechanism 72 is configured to shrink a diameter of the brake shoe 74 when the hand guard 16 is pressed down forward, and enlarge the diameter of the brake shoe 74 when the hand guard 16 is lifted up rearward. When the diameter of the brake shoe 74 is shrunk, an inner peripheral surface of the brake shoe 74 and an outer peripheral surface of the brake drum 60 come into contact, and rotation of the output shaft 50 is restricted by frictional force therebetween.

The oil tank 36 shown in FIG. 4 stores lubricant oil for lubricating the saw chain 8. The oil tank 36 is provided with a cap 76 which detachably attaches to a replenishing opening 36a (see FIG. 5) for replenishing the oil tank 36 with the lubricant oil. As shown in FIG. 1, the cap 76 of the oil tank 36 is exposed to outside the left housing 10, and is disposed on a front lower left surface of the front main body housing 22a. A liquid level checking opening 78 through which a liquid level in the oil tank 36 can be visually checked from outside is provided in the left housing 10 on the front side relative to the cap 76.

The oil pump 38 shown in FIG. 4 is configured to cooperate with rotation of the motor 34 to suction the lubricant oil in the oil tank 36 through an inlet pipe 80 and feed out the lubricant oil toward the guide bar 6 through an outlet pipe 82. A worm gear 84 for driving the oil pump 38 is fitted at a vicinity of a left end of the output shaft 50 of the motor 34. As shown in FIG. 5, the worm gear 84 is disposed on the left side relative to the stator 44 and the cooling fan 48 and on the right side relative to the bearing 54. A discharge amount of the lubricant oil supplied from the oil tank 36 to the guide bar 6 by the oil pump 38 is adjustable by an adjusting pin 94 (see FIG. 4).

As shown in FIG. 1, an adjusting opening 124 through which the adjusting pin 94 can be accessed from outside is provided in an upper surface of the main body housing 22. The user can adjust the discharge amount of the lubricant oil in the oil pump 38 by inserting a tool from the adjusting opening 124 and rotating the adjusting pin 94. In the left-and-right direction of the chain saw 2, the adjusting opening 124 is disposed on the left side relative to the top handle 24. In the front-and-rear direction of the chain saw 2, the adjusting opening 124 is disposed between a portion where the side handle 14 connects to the top handle 24 and a portion where the side handle 14 connects to the main body housing 22. By providing the adjusting opening 124 at such a location, the user can easily insert the tool therein, and the discharge amount of the lubricant oil in the oil pump 38 can be adjusted easily.

When the cutting target is cut by using the chain saw 2, the guide bar 6 becomes hot due to frictional heat between the saw chain 8 and the guide bar 6. Especially in a case where a radius of curvature at the distal end of the guide bar 6 is small, a large quantity of frictional heat is generated at the distal end of the guide bar 6, and the guide bar 6 becomes even hotter. In the configuration as with the chain saw 2 of the present embodiment in which the nut 68 is exposed to outside by protruding outward than the outer cover 23, when the nut 68 becomes hot due to heat transfer from the guide bar 6, there is a risk that the user may inadvertently touch the high-temperature nut 68.

As shown in FIG. 8, in the chain saw 2 of the present embodiment, the outer guide plate 62, the heat insulating portion 20b, the sleeve 25, and the washer 71 constitute a heat transfer path from the guide bar 6 to the nut 68. This heat transfer path is provided with a heat insulating structure constituted of the resin heat insulating portion 20b. With such a configuration, the nut 68 can be suppressed from becoming hot due to the heat transfer from the high-temperature guide bar 6 to the nut 68.

Figure 9:
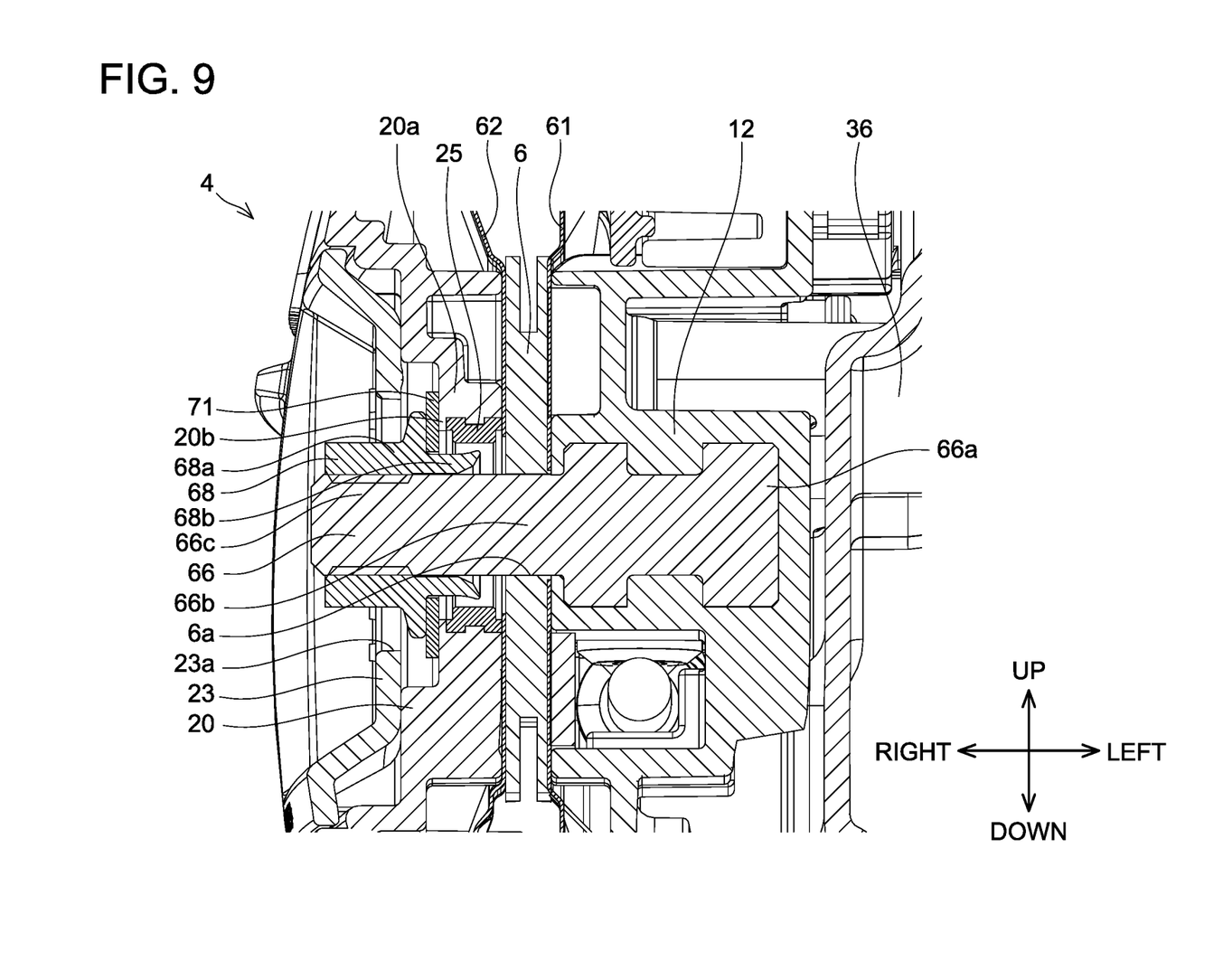
FIG. 9 is a vertical cross-sectional view of a chain saw 2 of a variant in a vicinity of a bolt 66 and a nut 68.

The heat insulating structure provided on the heat transfer path from the guide bar 6 to the nut 68 is not limited to the above example. For example, as shown in FIG. 9, the heat insulating portion 20b, which is a part of the sprocket cover 20, may be interposed between the sleeve 25 and the washer 71. In this case, the sleeve 25 does not directly contact the washer 71. The sleeve 25 may directly contact the outer guide plate 62. In the configuration shown in FIG. 9, the outer guide plate 62, the sleeve 25, the heat insulating portion 20b, and the washer 71 constitute the heat transfer path from the guide bar 6 to the nut 68. This heat transfer path is provided with the heat insulating structure constituted of the resin heat insulating portion 20b. With such a configuration, the nut 68 can be suppressed from becoming hot due to the heat transfer from the high-temperature guide bar 6 to the nut 68.

Figure 10:
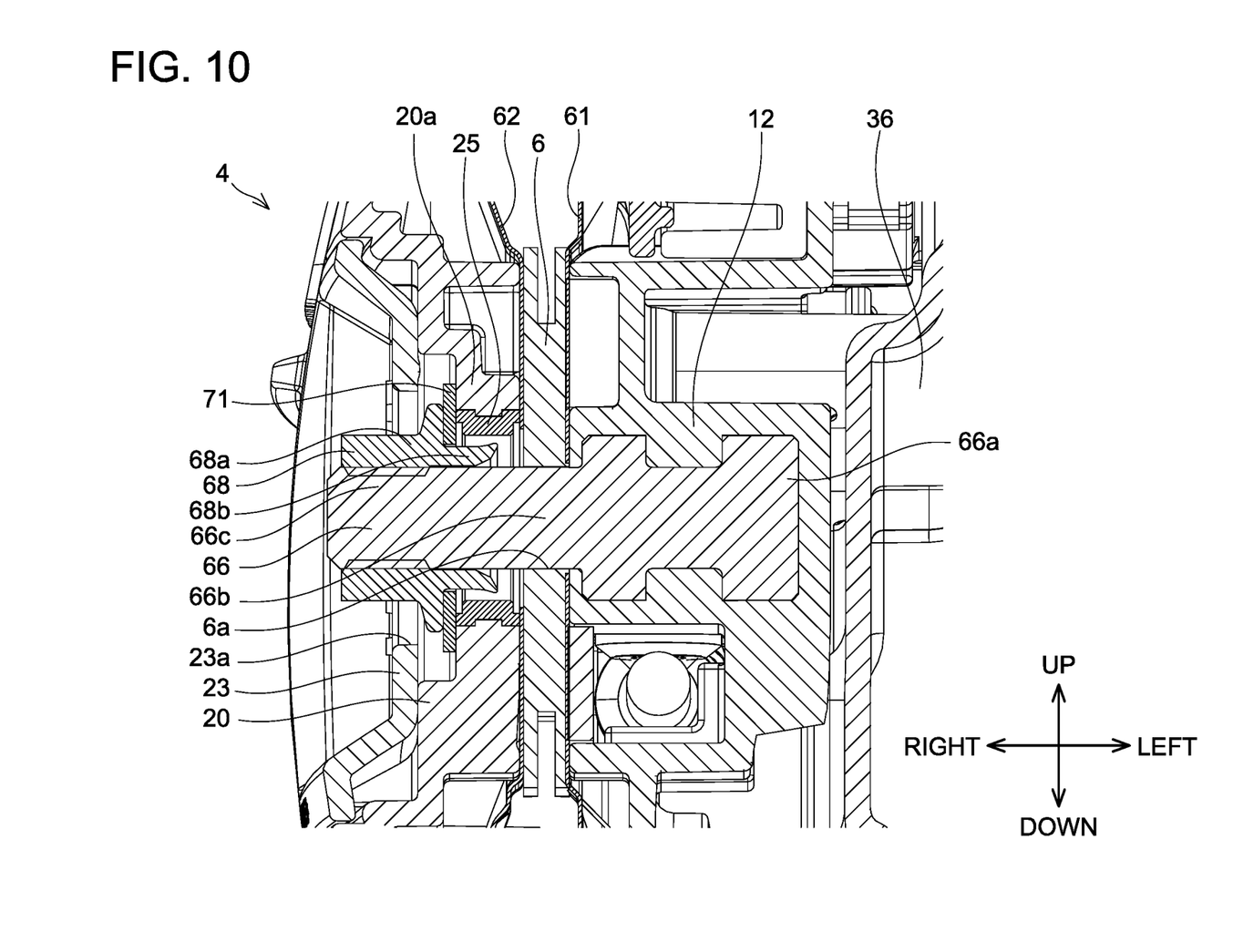
FIG. 10 is a vertical cross-sectional view of a chain saw 2 of another variant in a vicinity of a bolt 66 and a nut 68.

Alternatively, as shown in FIG. 10, the heat insulating portion 20b may not be provided in the sprocket cover 20, and the washer 71 constituted of resin may be used instead. In this case, the sleeve 25 may directly contact the outer guide plate 62 and the washer 71. In the configuration shown in FIG. 10, the outer guide plate 62, the sleeve 25, and the washer 71 constitute the heat transfer path from the guide bar 6 to the nut 68. This heat transfer path is provided with the heat insulating structure constituted of the resin washer 71. With such a configuration, the nut 68 can be suppressed from becoming hot due to the heat transfer from the high-temperature guide bar 6 to the nut 68.

Figure 11:
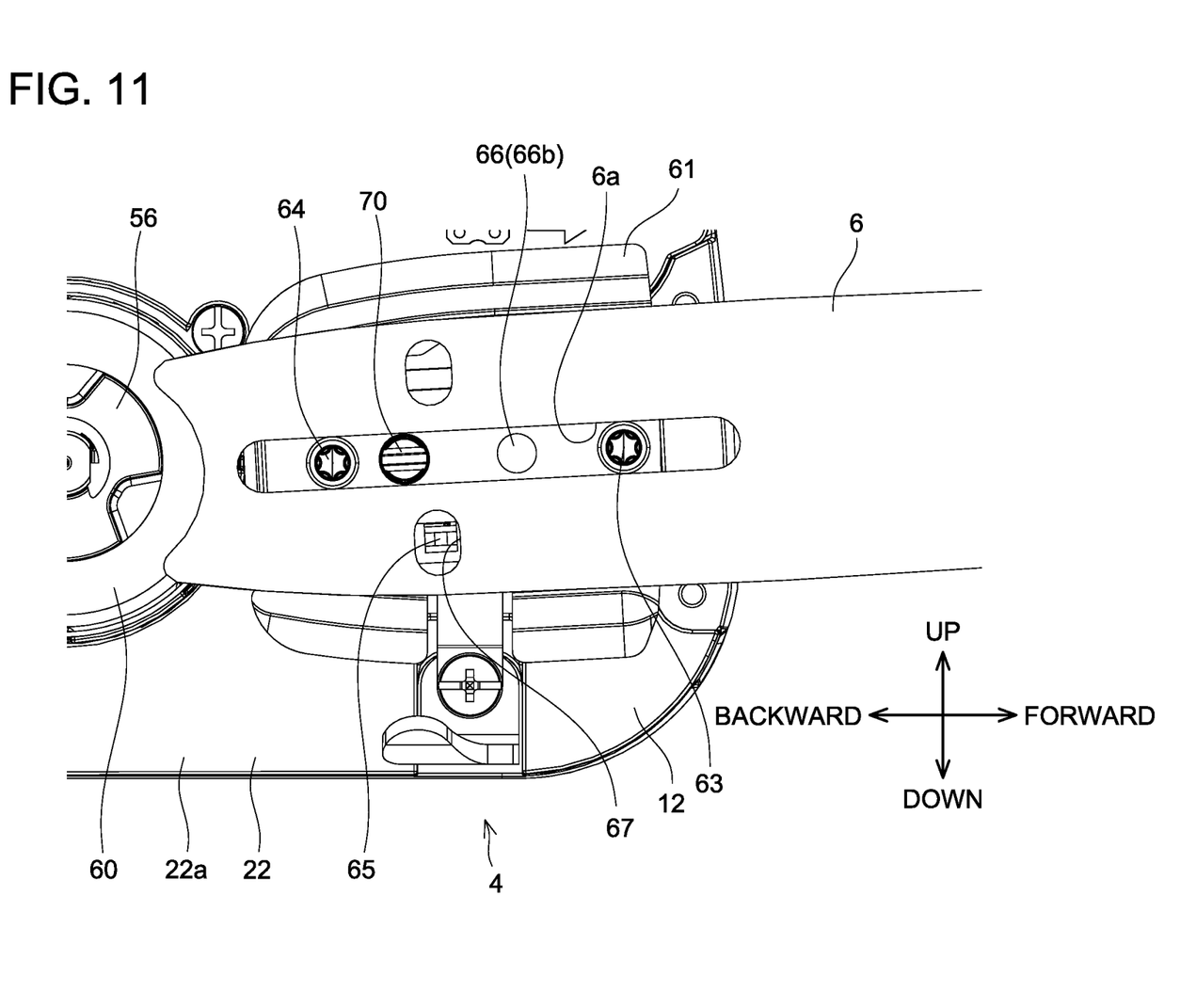
FIG. 11 is a right-side view of a chain saw 2 of yet another variant in a vicinity of a long hole 6*a* in a guide bar 6 in a state where a sprocket cover 20 is detached.

Alternatively, as shown in FIG. 11, a diameter of the shaft portion 66b of the bolt 66 may be made smaller than a width of the long hole 6a of the guide bar 6 so that the bolt 66 does not directly contact the guide bar 6. In this case, an air layer between the shaft portion 66b of the bolt 66 and the guide bar 6 functions as a heat insulating structure on a heat transfer path from the guide bar 6 to the nut 68 via the bolt 66. With such a configuration, the nut 68 can be suppressed from becoming hot due to the heat transfer from the high-temperature guide bar 6 to the nut 68. In the example shown in FIG. 11, the bolt 66 does not receive a load in the up-and-down direction which is applied from the guide bar 6 to the main body 4, and thus another support pin 63 penetrating the long hole 6a is provided. In the configuration shown in FIG. 11, the load in the up-and-down direction which is applied from the guide bar 6 to the main body 4 is received by the support pin 64 and the support pin 63, by which the guide bar 6 can securely be fixed to the main body 4.

Figure 12:
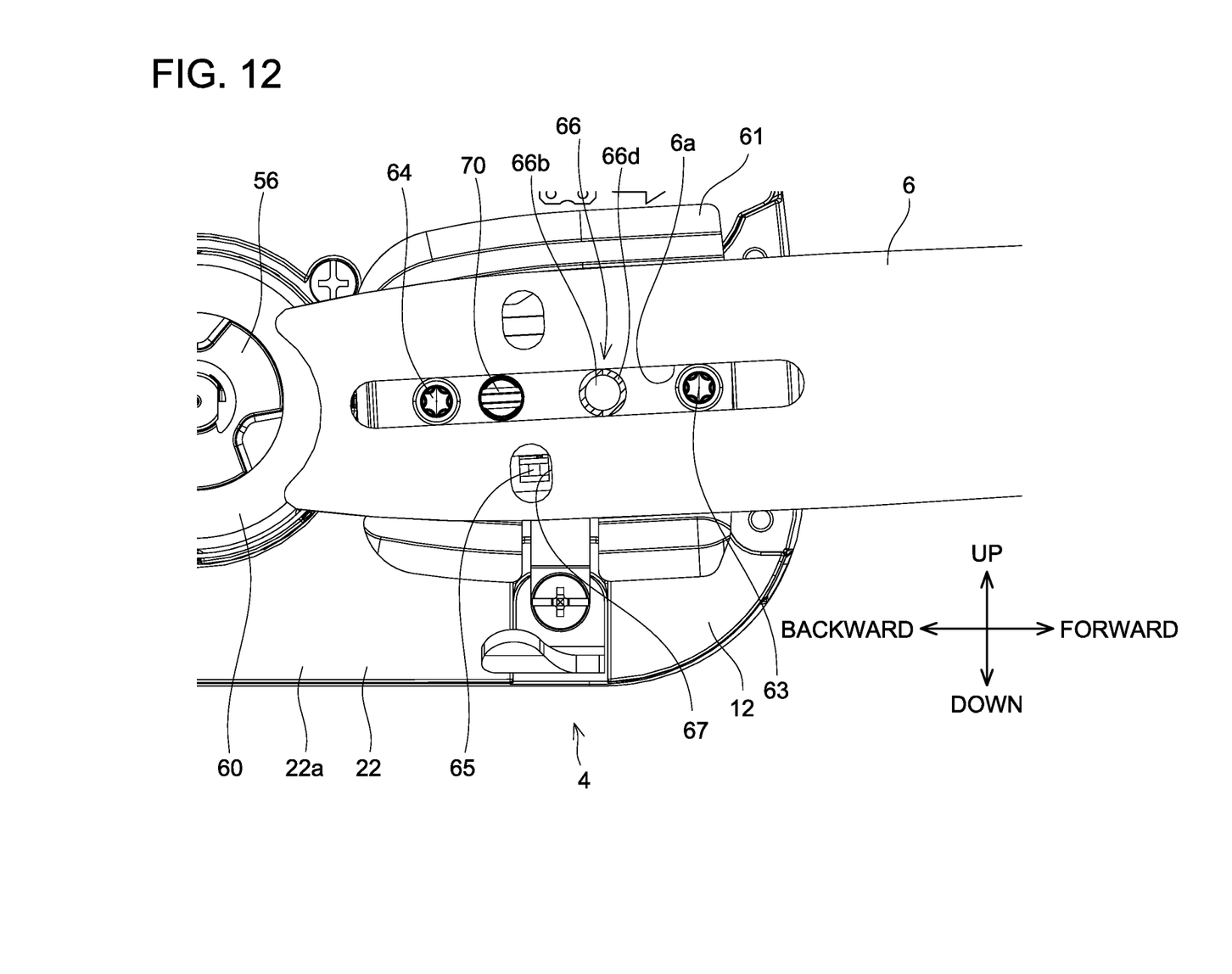
FIG. 12 is a right-side view of a chain saw 2 of still another variant in a vicinity of a long hole 6*a* in a guide bar 6 in a state where a sprocket cover 20 is detached.

Alternatively, as shown in FIG. 12, a heat insulating portion 66d constituted of resin may be provided on an outer periphery of the shaft portion 66b of the bolt 66 so that the bolt 66 contacts the guide bar 6 via the heat insulating portion 66d. In this case, the heat insulating portion 66d of the bolt 66 functions as a heat insulating structure on the heat transfer path from the guide bar 6 to the nut 68 via the bolt 66. With such a configuration, the nut 68 can be suppressed from becoming hot due to the heat transfer from the high-temperature guide bar 6 to the nut 68. In the example shown in FIG. 12, another support pin 63 penetrating the long hole 6a is provided so that the heat insulating portion 66d of the bolt 66 does not receive the load in the up-and-down direction applied from the guide bar 6 to the main body 4. In the configuration shown in FIG. 12, the load in the up-and-down direction which is applied from the guide bar 6 to the main body 4 is received by the support pin 64 and the support pin 63, by which the guide bar 6 can securely be fixed to the main body 4. Further, the heat insulating portion 66d of the bolt 66 can be suppressed from being damaged.

As above, in one or more embodiments, the chain saw 2 includes the saw chain 8, the guide bar 6 to which the saw chain 8 is attached, the sprocket 56 configured to move the saw chain 8 along the periphery of the guide bar 6, the motor 34 (an example of the prime mover) configured to rotate the sprocket 56, the main body housing 22 (an example of the housing) that houses the motor 34, the bolt 66 protruding from the main body housing 22 and penetrating the long hole 6a (an example of the hole) provided in the guide bar 6, and the nut 68 screwed to the bolt 66 to fix the guide bar 6 to the main body housing 22. The nut 68 is exposed to outside. The heat insulating structure is provided on the heat transfer path between the nut 68 and the guide bar 6. According to the above configuration, since the heat insulating structure is provided on the heat transfer path from the guide bar 6 to the nut 68, the nut 68 can be suppressed from becoming hot due to the heat transfer from the high-temperature guide bar 6 to the nut 68.

In one or more embodiments, the chain saw 2 further includes the sprocket cover 20 constituted of resin and covering the sprocket 56. The sprocket cover 20 is interposed between the nut 68 and the guide bar 6. According to the above configuration, since the heat insulating structure constituted of the resin sprocket cover 20 is provided on the heat transfer path from the guide bar 6 to the nut 68, the nut 68 can be suppressed from becoming hot due to the heat transfer from the high-temperature guide bar 6 to the nut 68.

In one or more embodiments, the sprocket cover 20 includes the sleeve 25 constituted of metal and interposed between the nut 68 and the guide bar 6, and the heat insulating portion 20*b* constituted of resin and interposed between the sleeve 25 and the guide bar 6 (see FIG. 8). In the configuration in which the resin sprocket cover 20 is interposed between the nut 68 and the guide bar 6, if a thickness of the sprocket cover 20 interposed between the nut 68 and the guide bar 6 is thick, the sprocket cover 20 might be buckled and damaged when the nut 68 is firmly tightened. In the above configuration, the sleeve 25 receives a load applied upon tightening the nut 68, and thus the sprocket cover 20 can be suppressed from being buckled and damaged. In this case, the metal sleeve 25 constitutes a part of the heat transfer path from the guide bar 6 to the nut 68, however, according to the above configuration, since the heat insulating portion 20*b* is provided between the sleeve 25 and the guide bar 6, the nut 68 can be suppressed from becoming hot due to the heat transfer from the high-temperature guide bar 6 to the nut 68.

In one or more embodiments, the sprocket cover 20 includes the sleeve 25 constituted of metal and interposed between the nut 68 and the guide bar 6, and the heat insulating portion 20*b* constituted of resin and interposed between the nut 68 and the sleeve 25 (see FIG. 9). In the configuration in which the resin sprocket cover 20 is interposed between the nut 68 and the guide bar 6, if the thickness of the sprocket cover 20 interposed between the nut 68 and the guide bar 6 is thick, the sprocket cover 20 might be buckled and damaged when the nut 68 is firmly tightened. In the above configuration, the sleeve 25 receives the load applied upon tightening the nut 68, and thus the sprocket cover 20 can be suppressed from being buckled and damaged. In this case, the metal sleeve 25 constitutes a part of the heat transfer path from the guide bar 6 to the nut 68, however, according to the above configuration, since the heat insulating portion 20*b* is provided between the nut 68 and the sleeve 25, the nut 68 can be suppressed from becoming hot due to the heat transfer from the high-temperature guide bar 6 to the nut 68.

In one or more embodiments, the chain saw 2 further includes the washer 71 constituted of resin. The sprocket cover 20 includes the sleeve 25 constituted of metal and interposed between the nut 68 and the guide bar 6. The washer 71 is interposed between the nut 68 and the sleeve 25 (see FIG. 10). In the configuration in which the resin sprocket cover 20 is interposed between the nut 68 and the guide bar 6, if the thickness of the sprocket cover 20 interposed between the nut 68 and the guide bar 6 is thick, the sprocket cover 20 might be buckled and damaged when the nut 68 is firmly tightened. In the above configuration, the sleeve 25 receives the load applied upon tightening the nut 68, and thus the sprocket cover 20 can be suppressed from being buckled and damaged. In this case, the metal sleeve 25 constitutes a part of the heat transfer path from the guide bar 6 to the nut 68, however, according to the above configuration, since the resin washer 71 between the nut 68 and the sleeve 25 functions as the heat insulating structure, the nut 68 can be suppressed from becoming hot due to the heat transfer from the high-temperature guide bar 6 to the nut 68.

In one or more embodiments, the heat insulating portion formed by air is provided between the inner peripheral surface of the long hole 6*a* of the guide bar 6 and the bolt 66 (see FIG. 11). As the heat transfer path from the guide bar 6 to the nut 68, aside from the path that transfers the heat from the guide bar 6 to the nut 68 without intervention of the bolt 66, there also is the path on which the heat transfers from the guide bar 6 to the bolt 66 and then from the bolt 66 to the nut 68. In the above configuration, since the aerial heat insulating portion is provided on the heat transfer path from the guide bar 6 to the bolt 66, the nut 68 can be suppressed from becoming hot due to the heat transfer from the high-temperature guide bar 6 to the nut 68.

In one or more embodiments, the heat insulating portion 66*d* constituted of resin is provided between the inner peripheral surface of the long hole 6*a* of the guide bar 6 and the bolt 66 (see FIG. 12). As the heat transfer path from the guide bar 6 to the nut 68, aside from the path that transfers the heat from the guide bar 6 to the nut 68 without intervention of the bolt 66, there also is the path on which the heat transfers from the guide bar 6 to the bolt 66 and then from the bolt 66 to the nut 68. In the above configuration, since the resin heat insulating portion 66*d* is provided on the heat transfer path from the guide bar 6 to the bolt 66, the nut 68 can be suppressed from becoming hot due to the heat transfer from the high-temperature guide bar 6 to the nut 68.

In one or more embodiments, when the chain saw 2 is in use, the saw chain 8 is configured to be capable of moving along the periphery of the guide bar 6 at a speed of 18 m/s or more, more specifically capable of moving therealong at a speed of 20 m/s or more, and even more specifically capable of moving therealong at a speed of 22 m/s or more.

In a case where the saw chain 8 moves at a high speed along the periphery of the guide bar 6, the frictional heat between the saw chain 8 and the guide bar 6 becomes high, and the guide bar 6 thereby becomes hotter. According to the above configuration, since the heat insulating structure is provided on the heat transfer path from the guide bar 6 to the nut 68, the nut 68 can be suppressed from becoming hot due to the heat transfer from the higher-temperature guide bar 6 to the nut 68.

In one or more embodiments, a minimum radius of curvature of the periphery of the guide bar 6 is 20 mm or less, more specifically 15 mm or less, and even more specifically 10 mm or less. In a case where the guide bar 6 has a portion with a small radius of curvature, the frictional heat between the saw chain 8 and the guide bar 6 becomes high at such the portion, as a result of which the guide bar 6 becomes hotter. According to the above configuration, since the heat insulating structure is provided on the heat transfer path from the guide bar 6 to the nut 68, the nut 68 can be suppressed from becoming hot due to the heat transfer from the higher-temperature guide bar 6 to the nut 68.

In one or more embodiments, the prime mover configured to rotate the sprocket 56 is the motor 34 driven by the electric power. In the case where the prime mover is the motor 34, the main body housing 22 the housing does not have a portion having very high temperature compared to a case where the prime mover is an engine, and thus, the user is at a greater risk of inadvertently touching the nut 68 exposed to outside without paying much attention. According to the above configuration, since the heat insulating structure is provided on the heat transfer path from the guide bar 6 to the nut 68, the nut 68 can be suppressed from becoming hot due to the heat transfer from the high-temperature guide bar 6 to the nut 68.

In one or more embodiments, the chin saw 2 further includes the battery B configured to be detachably attached to the main body housing 22. The motor 34 is configured to be driven by the electric power from the battery B. The chain saw 2 configured to drive the motor 34 by the electric power supplied from the battery B does not require a power cord, which provides improved workability with the chain saw 2, however, places the user at a greater risk of inadvertently touching the nut 68 exposed to outside. According to the above configuration, since the heat insulating structure is provided on the heat transfer path from the guide bar 6 to the nut 68, the nut 68 can be suppressed from becoming hot due to the heat transfer from the high-temperature guide bar 6 to the nut 68.

The chain saw 2 according to an embodiment may be supplied with electric power through a power cord without attaching the battery B.

The chain saw 2 according to an embodiment may include an engine instead of the motor 34 as the prime mover configured to rotate the sprocket 56. In this case, the output shaft 50 connected to the sprocket 56 may be rotated by being driven by the engine.

What is claimed is:

1. A chain saw comprising:
   a saw chain;
   a guide bar to which the saw chain is attached;
   a sprocket configured to move the saw chain along a periphery of the guide bar;
   a motor driven by electric power and configured to rotate the sprocket;
   a housing that houses the motor;
   a bolt protruding from the housing and penetrating a hole provided in the guide bar;
   a nut screwed to the bolt to fix the guide bar to the housing;
   a sprocket cover constituted of resin and covering the sprocket; and
   a sleeve constituted of metal and interposed between the nut and the guide bar,
   wherein
   the nut is exposed to outside,
   a part of the sprocket cover is interposed between the metal sleeve and the guide bar, and
   the part of the sprocket cover is in contact with the metal sleeve and is arranged as a heat insulating structure such that the part of the sprocket cover and the metal sleeve are on a heat transfer path that is between the nut and the guide bar, and wherein the part of the sprocket cover spaces the metal sleeve from the guide bar to prevent the nut from becoming hot due to heat transfer from the guide bar.

2. The chain saw according to claim 1, wherein when the chain saw is in use, the saw chain is configured to be capable of moving along the periphery of the guide bar at a speed of 18 m/s or more.

3. The chain saw according to claim 1, wherein a minimum radius of curvature of the periphery of the guide bar is 20 mm or less.

4. The chain saw according to claim 1, further comprising a battery configured to be detachably attached to the housing,
   wherein the motor is configured to be driven by the electric power from the battery.

5. A chain saw comprising:
   a saw chain;
   a guide bar to which the saw chain is attached;
   a sprocket configured to move the saw chain along a periphery of the guide bar;
   a motor driven by electric power and configured to rotate the sprocket;
   a housing that houses the motor;
   a bolt protruding from the housing and penetrating a hole provided in the guide bar;
   a nut screwed to the bolt to fix the guide bar to the housing;
   a sprocket cover constituted of resin and covering the sprocket; and
   a sleeve constituted of metal and interposed between the nut and the guide bar,
   wherein
   the nut is exposed to outside,
   a part of the sprocket cover is interposed between the nut and the metal sleeve, and
   the part of the sprocket cover is in contact with the metal sleeve and is arranged as a heat insulating structure such that the part of the sprocket cover and the metal sleeve are on a heat transfer path that is between the nut and the guide bar,
   wherein the part of the sprocket cover spaces the nut from the guide bar to prevent the nut from becoming hot due to heat transfer from the guide bar.

6. The chain saw according to claim 5, wherein when the chain saw is in use, the saw chain is configured to be capable of moving along the periphery of the guide bar at a speed of 18 m/s or more.

7. The chain saw according to claim 5, wherein a minimum radius of curvature of the periphery of the guide bar is 20 mm or less.

8. The chain saw according to claim 5, further comprising a battery configured to be detachably attached to the housing, wherein the motor is configured to be driven by the electric power from the battery.

* * * * *